United States Patent
Asada et al.

(10) Patent No.: US 8,271,712 B2
(45) Date of Patent: Sep. 18, 2012

(54) INFORMATION PROCESSING APPARATUS, IMAGE FORMING APPARATUS AND INFORMATION PROCESSING METHOD

(75) Inventors: Yasunori Asada, Ebina (JP); Masahiro Kobata, Ebina (JP); Seiji Iino, Tokyo (JP); Takanori Fukuoka, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 279 days.

(21) Appl. No.: 12/722,196

(22) Filed: Mar. 11, 2010

(65) Prior Publication Data

US 2011/0087817 A1  Apr. 14, 2011

(30) Foreign Application Priority Data

Oct. 13, 2009 (JP) .................. 2009-236244

(51) Int. Cl.
*G06F 13/00* (2006.01)
(52) U.S. Cl. ........................ 710/301; 710/302
(58) Field of Classification Search ................. 710/301
See application file for complete search history.

(56) References Cited

U.S. PATENT DOCUMENTS

| | | | | |
|---|---|---|---|---|
| 5,235,384 A | * | 8/1993 | Oka et al. ................ | 399/27 |
| 5,278,730 A | * | 1/1994 | Kikinis .................... | 361/679.32 |
| 5,297,272 A | * | 3/1994 | Lu et al. .................. | 710/301 |
| 5,815,283 A | * | 9/1998 | Watanabe et al. ......... | 358/296 |
| 5,848,250 A | * | 12/1998 | Smith et al. .............. | 710/300 |
| 7,287,104 B2 | * | 10/2007 | Takahashi ................ | 710/52 |
| 2005/0128238 A1 | * | 6/2005 | Silverbrook ............. | 347/19 |
| 2005/0151774 A1 | * | 7/2005 | Silverbrook ............. | 347/19 |
| 2005/0172118 A1 | * | 8/2005 | Nasu ...................... | 713/156 |
| 2005/0243155 A1 | * | 11/2005 | Silverbrook ............. | 347/109 |
| 2006/0174048 A1 | | 8/2006 | Ohara | |

FOREIGN PATENT DOCUMENTS

| | | |
|---|---|---|
| JP | 2006-209456 A | 8/2006 |
| JP | 2007-210144 A | 8/2007 |

* cited by examiner

*Primary Examiner* — Ryan Stiglic
(74) *Attorney, Agent, or Firm* — Sughrue Mion, PLLC

(57) ABSTRACT

According to an aspect of the invention, an information processing apparatus includes a main board, an expanded CPU board connector, an external device connector, a detection unit. A first CPU is mounted on the main board. The expanded CPU board connector is disposed on the main board. An expanded CPU board is connectable to the expanded CPU board connector. A second CPU is mounted on the expanded CPU board. The external device connector is disposed on the main board. An external device is connected to the external device connector. The detection unit detects that the expanded CPU board is installed to the expanded CPU board connector. The first CPU controls the information processing apparatus to change a master of control of the information processing apparatus from the first CPU to the second CPU.

4 Claims, 12 Drawing Sheets (FIRST EMBODIMENT)

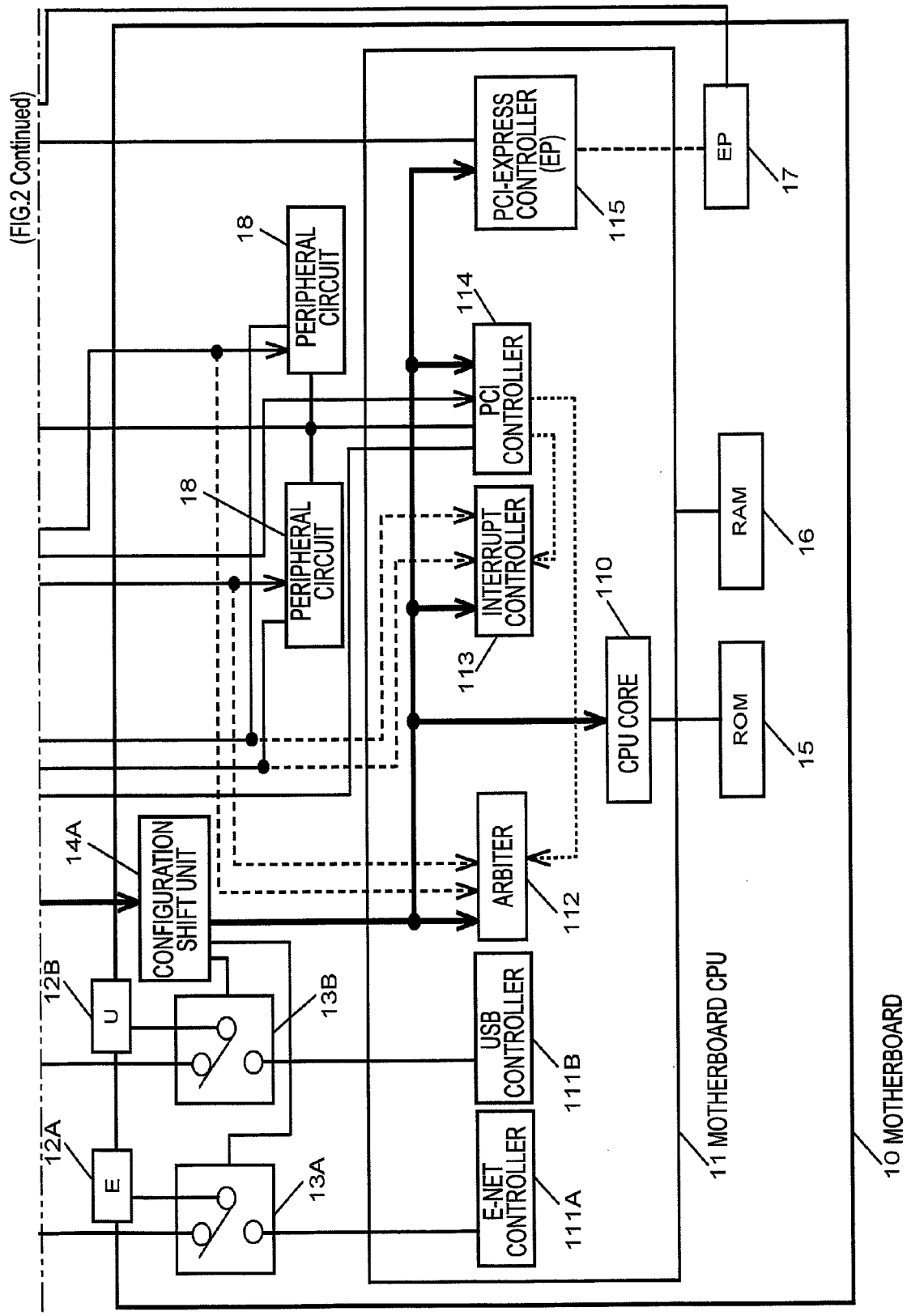

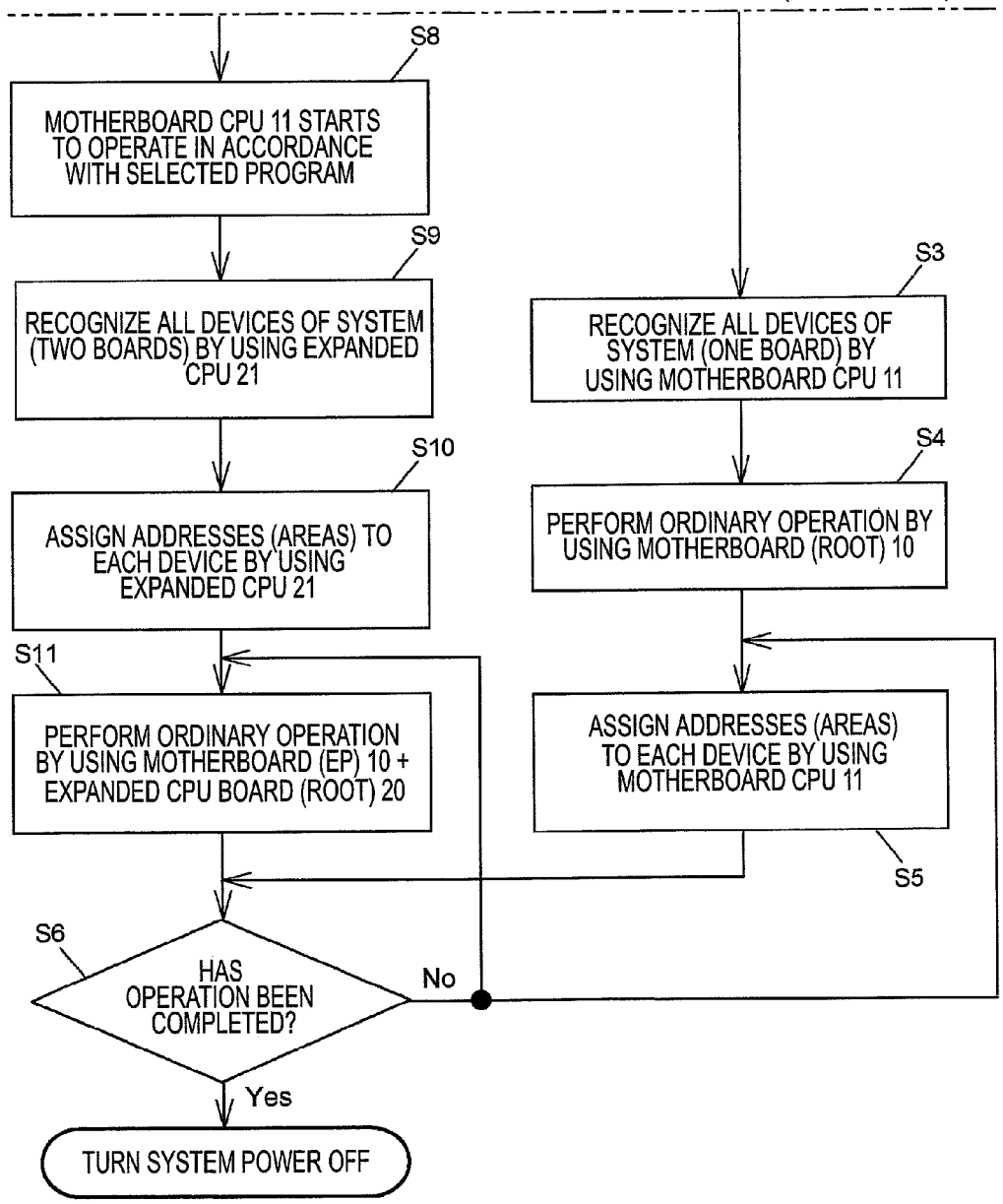

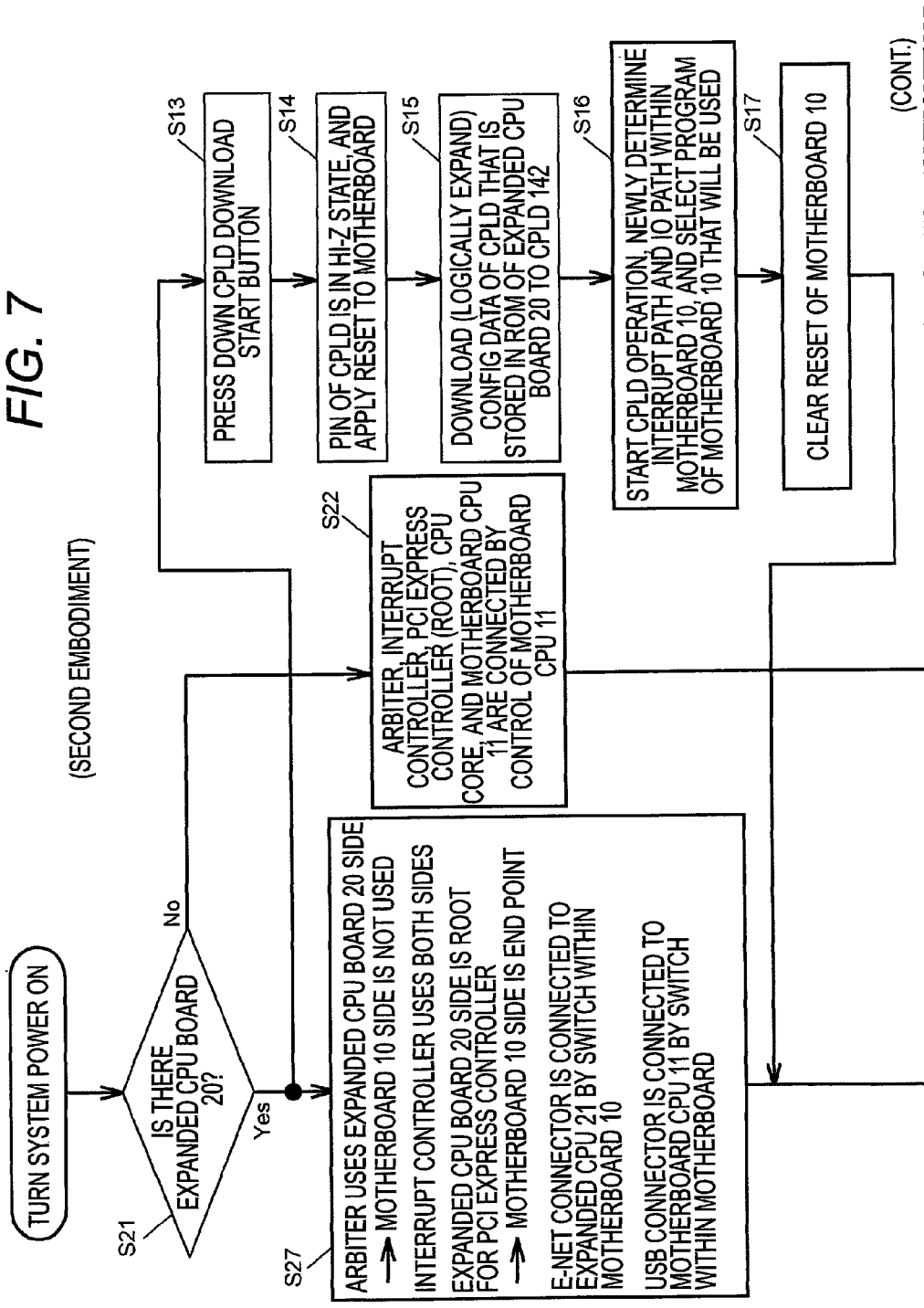

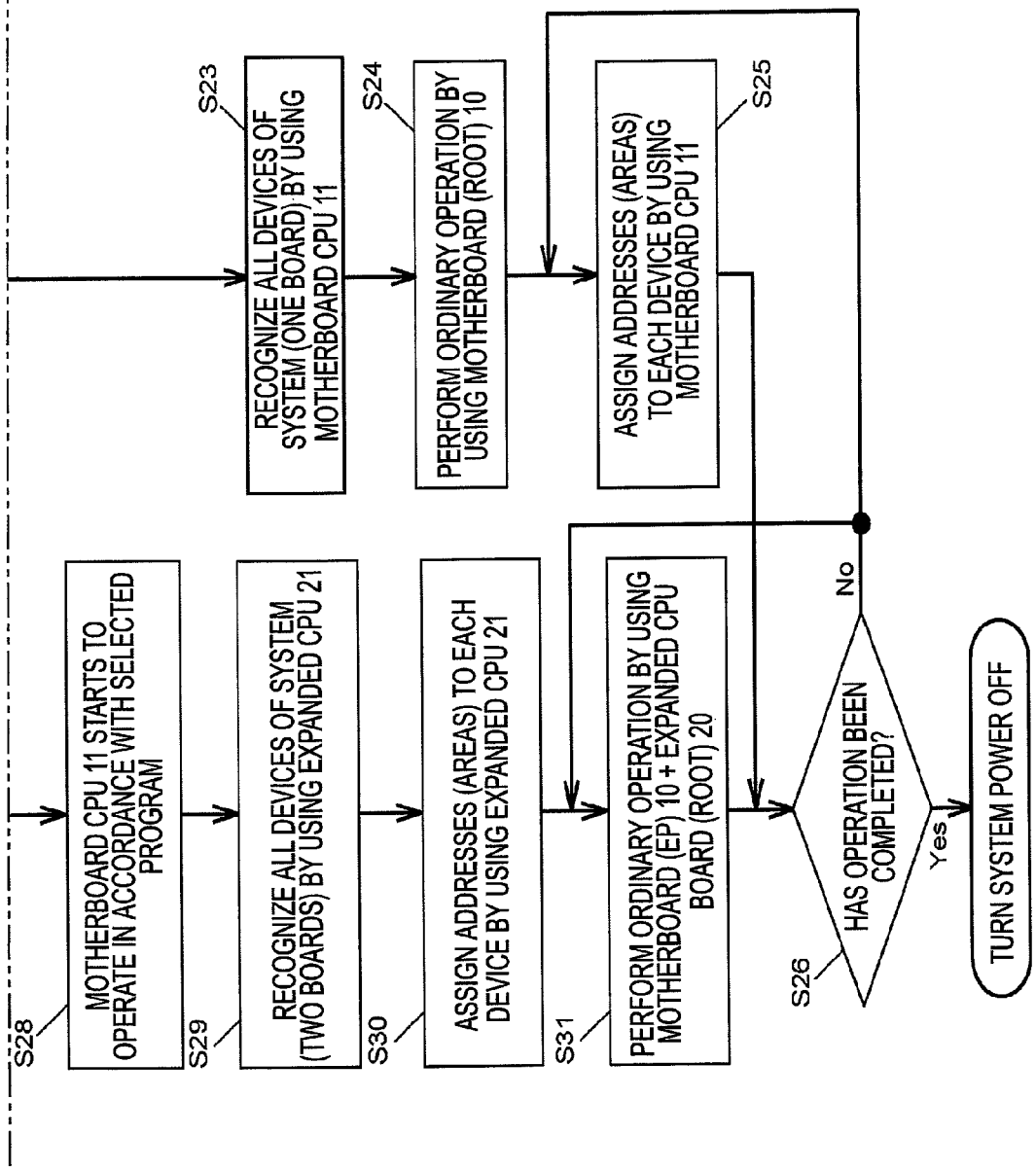

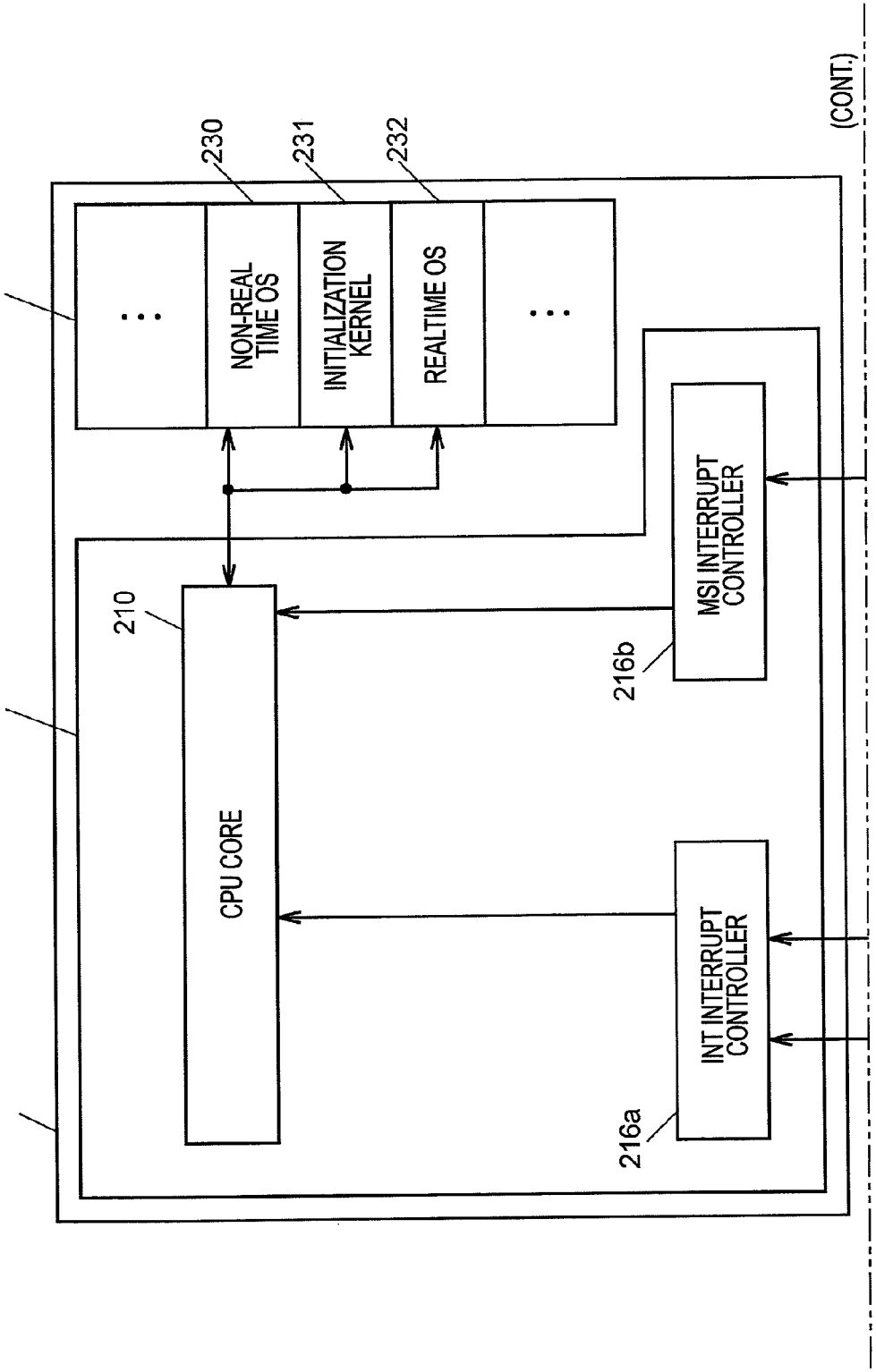

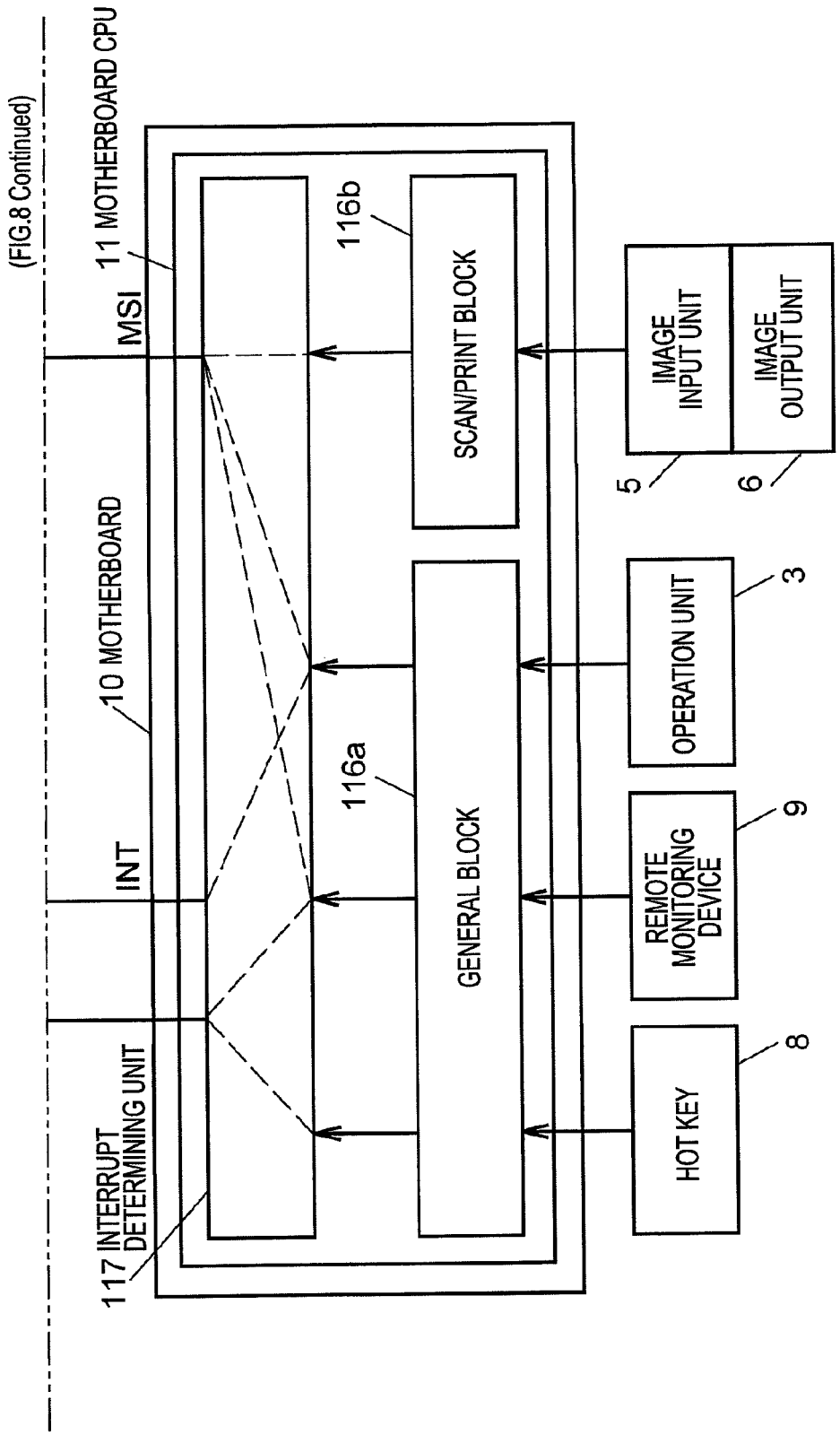

INFORMATION PROCESSING APPARATUS, IMAGE FORMING APPARATUS AND INFORMATION PROCESSING METHOD

CROSS-REFERENCE TO RELATED APPLICATIONS

This application is based upon and claims priority under 35 USC 119 from Japanese Patent Application No. 2009-236244, filed Oct. 13, 2009.

BACKGROUND

1. Technical Field

The present invention relates to an information processing apparatus, an image forming apparatus, and an information processing method.

2. Related Art

Recently, in order to improve the performance of printers, there have been cases where an expanded CPU board on which a CPU is mounted is additionally installed.

SUMMARY OF THE INVENTION

According to an aspect of the invention, an information processing apparatus includes a main board, an expanded CPU board connector, an external device connector, a detection unit. A first CPU is mounted on the main board. The expanded CPU board connector is disposed on the main board. An expanded CPU board is connectable to the expanded CPU board connector. A second CPU is mounted on the expanded CPU board. The external device connector is disposed on the main board. An external device is connected to the external device connector. The detection unit detects that the expanded CPU board is installed to the expanded CPU board connector. When the detection unit detects that the expanded CPU board is installed to the expanded CPU board connector, the first CPU controls the information processing apparatus to change a master of control, from the first CPU to the second CPU, of the information processing apparatus and signal control between the information processing apparatus and the external device.

BRIEF DESCRIPTION OF THE DRAWINGS

Exemplary embodiments of the invention will be described in detail based on the following figures, wherein:

FIG. 7 is a flowchart showing an example of the operation of an image forming apparatus according to the second exemplary embodiment of the present invention; and FIG. 8 is a diagram showing a configuration example of major parts of a motherboard and an expanded CPU board according to a third exemplary embodiment of the present invention.

DETAILED DESCRIPTION

[First Exemplary Embodiment]

Figure 1:
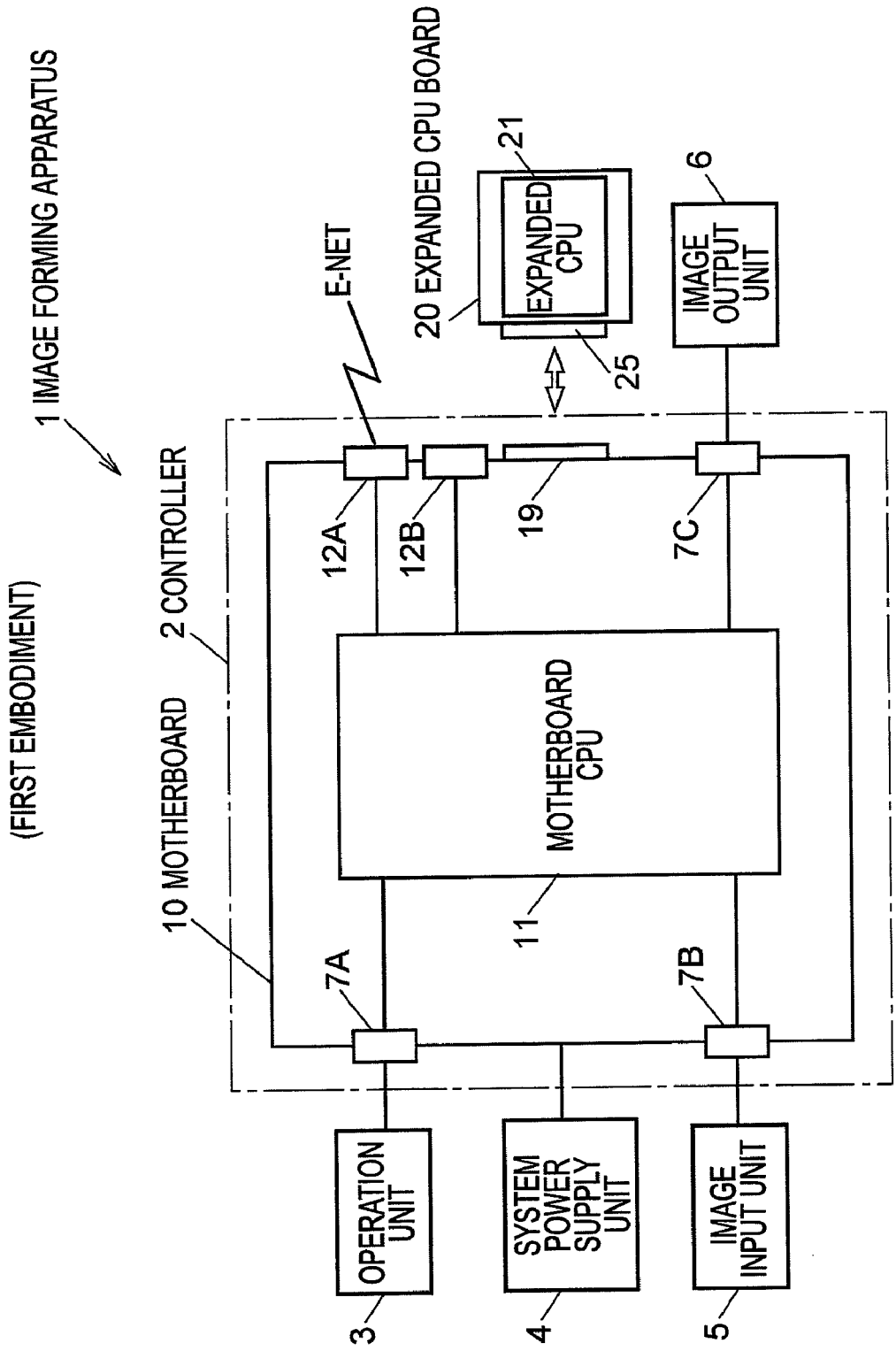
FIG. 1 is a schematic diagram showing a configuration example of an image forming apparatus according to a first exemplary embodiment of the present invention.

FIG. 1 is a schematic diagram showing a configuration example of an image forming apparatus according to a first exemplary embodiment of the present invention.

The image forming apparatus 1, for example, is a copier or a multifunctional apparatus. The image forming apparatus 1 is configured to include: a controller 2 that controls the overall operation of the image forming apparatus 1; an operation unit 3 such as a touch panel for which a user performs an operation such as an operation of setting printing conditions; a system power supply unit 4 that supplies power to the controller 2 and the like; an image input unit 5 that reads out image data from a document to acquire the image data; and an image output unit 6 that prints out the image data on a print sheet.

The controller 2 has a motherboard 10 that is an example of a main board on which a motherboard CPU (Central Processing Unit) 11 as a first CPU is mounted. An expanded CPU board 20 as a second CPU in which an expanded CPU 21 is mounted is installed to the motherboard 10.

The expanded CPU board 20 is installed, for example, for improving the performance (for example, the number of pages printed per minute) of the image forming apparatus 1, adding a new function, or the like.

The motherboard 10 includes: the motherboard CPU 11; an expanded CPU board 20 connector 19 to which the expanded CPU board 20 is allowed to be installed; interfaces 7A, 7B, and 7C that receive or output data among the operation unit 3, the image input unit 5, and the image output unit 6; an E-Net connector 12A to which Ethernet (registered trade mark) (E-Net) as one of LANs (Local Area Networks) is connected; and a USB connector 12B to which a USB device such as a facsimile, a USB memory, or the like is connected. To the Ethernet (registered trademark), a client PC (personal computer) or the like is connected. The USB device and the client PC are examples of external devices. The E-net connector 12A and the USB connector 12B are examples of external device connectors.

The motherboard CPU 11 has a function as a detection unit that detects the installation of the expanded CPU board 20. When the detection unit detects the installation of the expanded CPU board 20, the motherboard CPU 11 controls the operating body of system control including signal control for external devices to be shifted to the expanded CPU 21. The motherboard CPU 11, for example, is configured by an ASIC (Application Specific Integrated Circuit) in which the CPU is built.

The expanded CPU 21 has a higher performance (higher operating frequency) than the motherboard CPU 11. The expanded CPU 21, for example, is configured by an ASIC in which the CPU is built.

Figure 2:
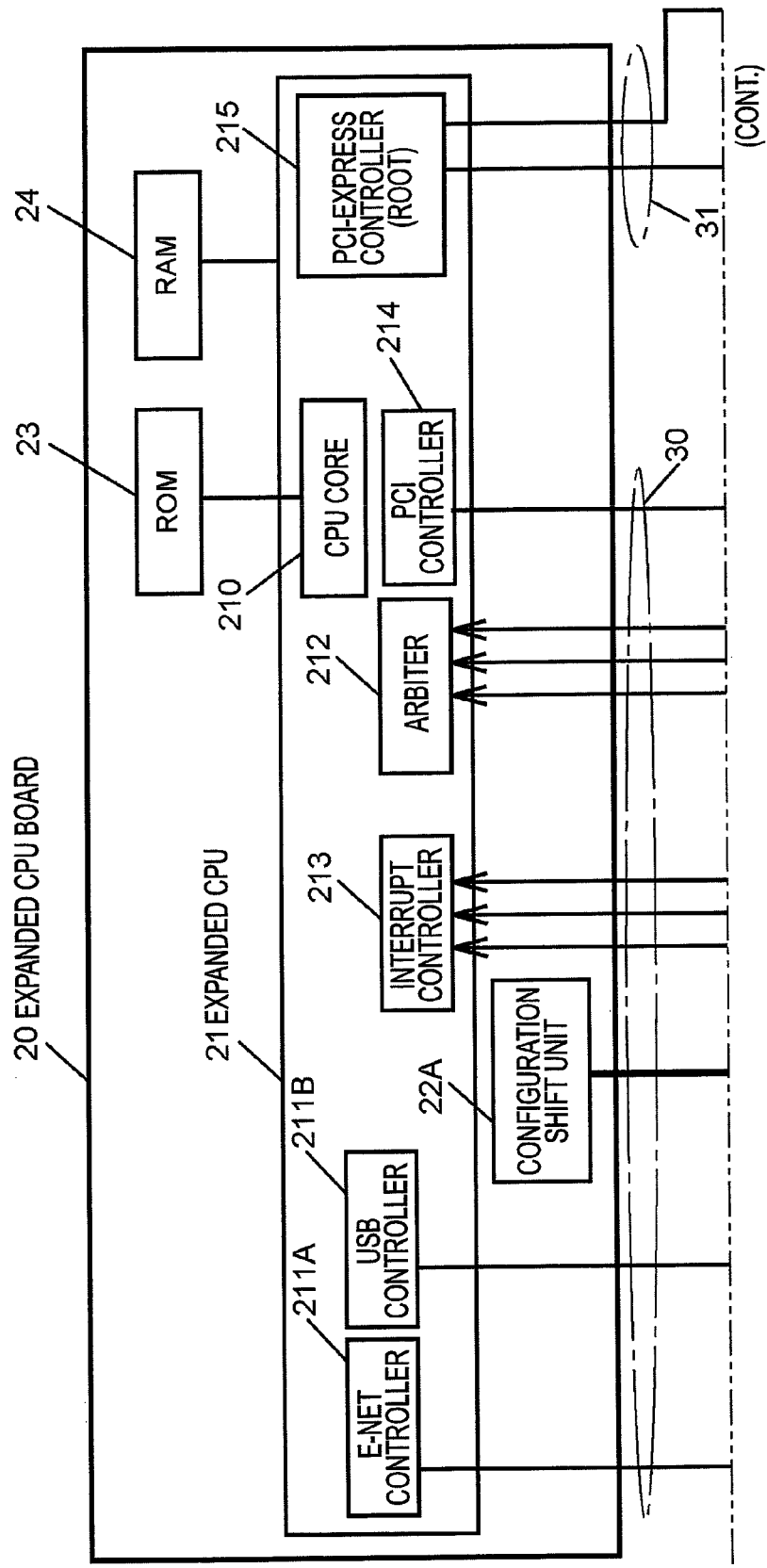
FIG. 2 is a diagram showing a configuration example of a motherboard and an expanded CPU board according to the first exemplary embodiment of the present invention.

FIG. 2 is a diagram showing a configuration example of the motherboard 10 and the expanded CPU board 20. In FIG. 2, the connectors 19 and 25 are not shown.

(Configuration of Motherboard)

The motherboard 10 includes: the motherboard CPU 11; the E-net connector 12A and the USB connector 12B; a plurality of (here, two) switches 13A and 13B connect the motherboard CPU 11 and the expanded CPU 21 to the connectors 12A and 12B; a configuration shift unit 14A that controls shifting of the switches 13A and 13B; a ROM (Read-Only Memory) 15 that stores a program executed by the motherboard CPU 11 therein; a RAM (Random Access Memory) 16 that stores image data and the like; an end point (EP) 17 of the PCI-Express specifications; and a plurality of (for example, two) peripheral circuits 18.

The motherboard CPU 11 includes: a CPU core 110; an E-net controller 111A; a USB controller 111B; an arbiter 112; an interrupt controller 113; a PCI controller 114 that controls a PCI bus 30 that is a parallel bus; and a PCI-Express controller 115 that controls a PCI-express bus 31 that is a serial bus.

The configuration shift unit 14A is configured to perform shifting of environment settings (configuration) by pulling down/up. The configuration shift unit 14A will be described in detail later.

As the ROM 15, a flash ROM, an EPROM, an EEPROM, or the like in which a program or the like can be written many times is used.

The plurality of peripheral circuits 18 perform image processing for the input image data. For example, the plurality of peripheral circuits 18 perform a process of expanding (rendering) the input image data into raster image data that is appropriate for the image output unit 6, a process of converting (color-converting) the raster image data into a display color system (for example, YMCK) that is appropriate for printing process, and the like.

The arbiter 112 serves as an adjusting means that adjusts the right of use of the PCI bus 30 when the peripheral circuit 18 or the like transmits data.

The interrupt controller 113 controls an interrupt access to the CPU core 110.

(Configuration of Expanded CPU Board)

The expanded CPU board 20 includes the expanded CPU 21, the configuration shift unit 22A, the ROM 23 such as the flash ROM, the EPROM, or the EEPROM, and the RAM 24.

The expanded CPU 21 includes a CPU core 210, an E-net controller 211A, a USB controller 211B, an arbiter 212, an interrupt controller 213, a PCI controller 214, and a PCI-controller 215.

The configuration shift unit 22A is configured to perform shifting of environment settings (configuration) by pulling down/up. The configuration shift unit 22A will be described in detail later.

The arbiter 212 serves as adjusting means that adjusts the right of use of the PCI bus 30 when the peripheral circuit 18 or the like transmits data.

The interrupt controller 213 controls an interrupt access to the CPU core 210.

Figure 3:
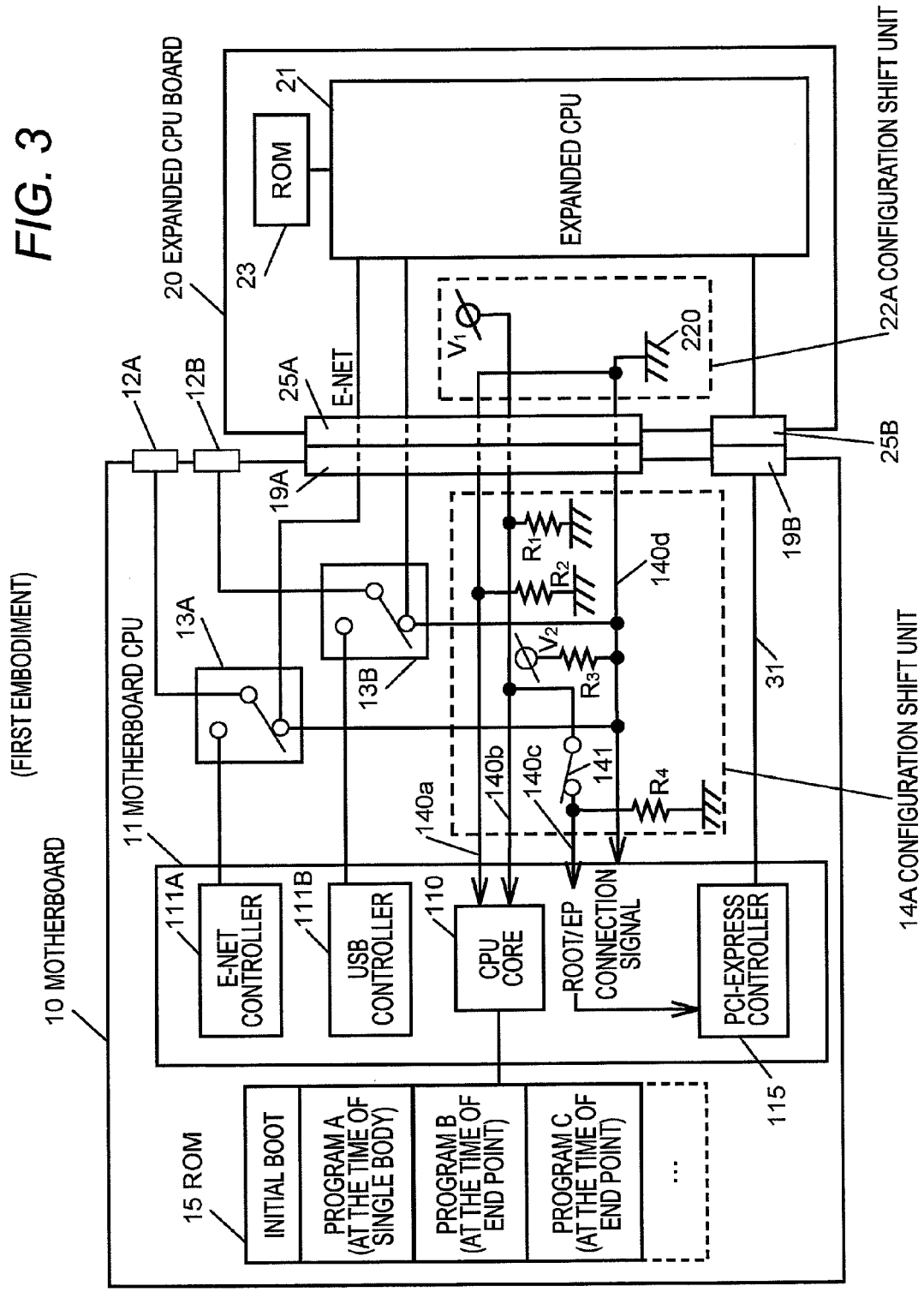
FIG. 3 is a diagram showing a configuration example of configuration shift units according to the first exemplary embodiment of the present invention.

FIG. 3 is a diagram showing a configuration example for a case where the configuration shift units 14A and 22A perform shifting by pulling down/up. As the expanded CPU board connectors 19 and 25, expanded CPU board connectors 19A and 25A connected to the PCI bus 30 and expanded CPU board connectors 19B and 25B connected to the PCI-Express bus 31 are used.

The configuration shift unit 22A of the expanded CPU board 20 derives signal lines 140a and 140d from a ground point 220 to the connector 25A and derives a signal line 140b from a power source V1 to the connector 25A.

The configuration shift unit 14A of the motherboard 10 derives the signal lines 140a and 140b from the connector 25A to the CPU core 110, derives a signal line 140c that is branched from the signal line 140b to the PCI-Express controller 115, and derives the signal line 140d from the connector 25A to the motherboard CPU 11. The signal lines 140a and 140b are grounded through resistors R1 and R2. In the signal line 140c, a switch 141 is inserted. The signal line 140c is grounded through a pull-down resistor R4. A power source V2 is connected to the signal line 140d through a pull-up resistor R3.

Before the expanded CPU board 20 is installed to the motherboard 10, the connecting signal of the signal line 140d is in a high level due to the pull-up resistor R3. On the other hand, after the expanded CPU board 20 is installed to the motherboard 10, the connection signal of the signal line 140d is in a low level due to the ground point 220.

When the switch 141 is operated to be opened, the signal of the signal line 140c is in the low level due to the pull-down resistor R4, and the motherboard 10 side serves as a root. On the other hand, when the switch 141 is operated to be closed, the signal of the signal line 140c is in the high level due to the power source V1, and the expanded CPU board 20 side serves as the root.

(Operation of Image Forming Apparatus)

Figure 4:
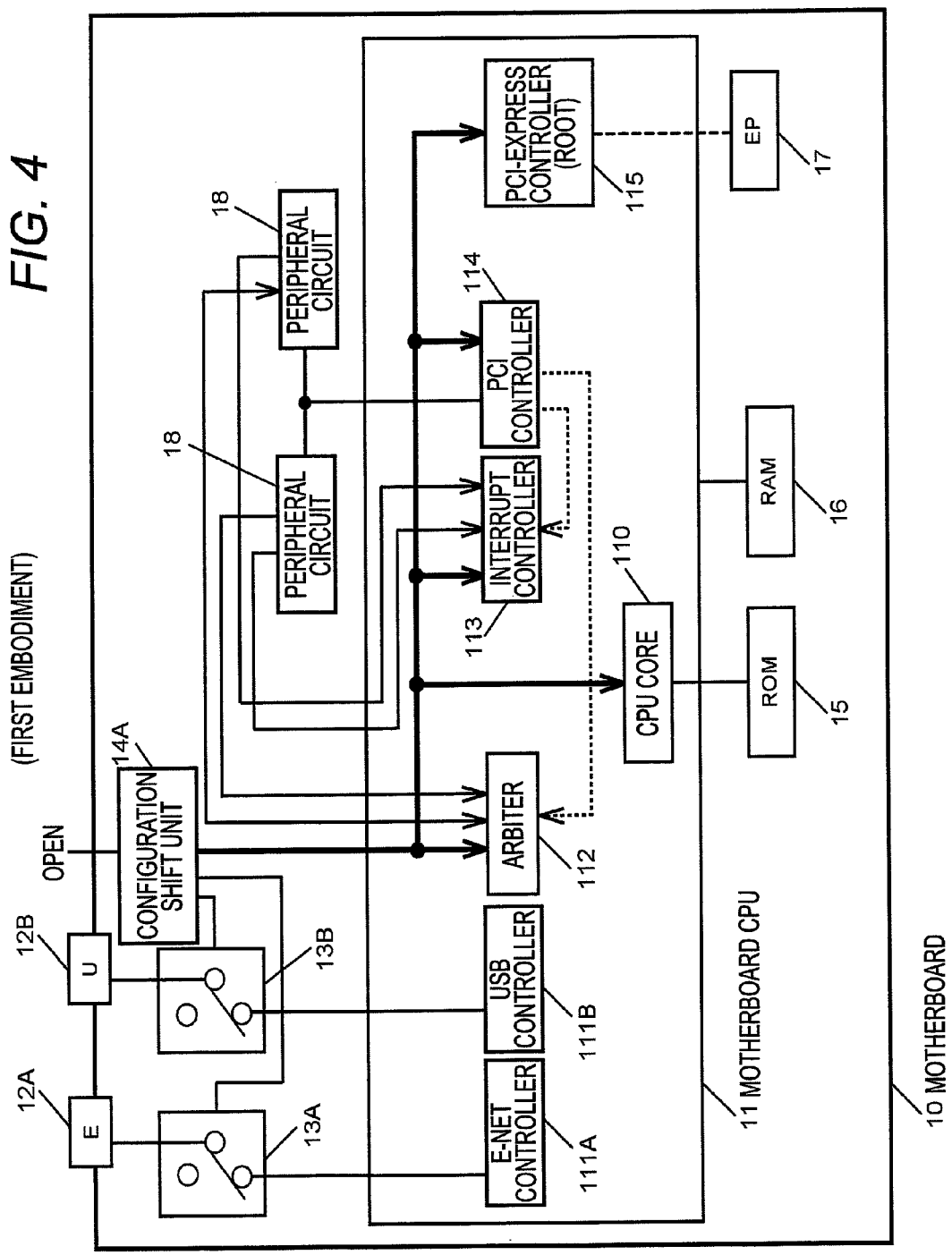
FIG. 4 is a diagram illustrating the operation of a motherboard before the installation of an expanded CPU board according to the first exemplary embodiment of the present invention.
Figure 5:
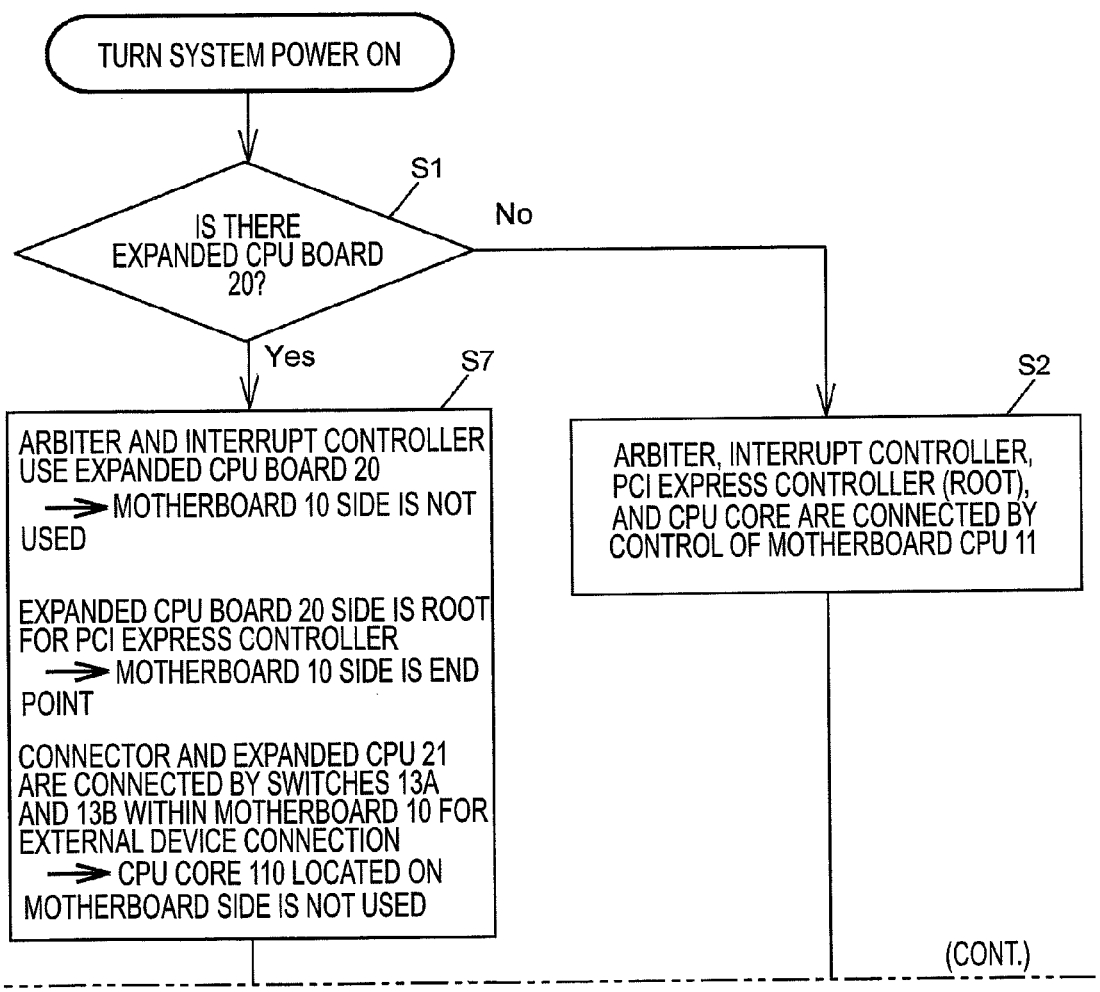
FIG. 5 is a flowchart showing an example of the operation of an image forming apparatus according to the first exemplary embodiment of the present invention.

FIG. 4 is a diagram illustrating the operation of the motherboard 10 before the installation of the expanded CPU board 20. FIG. 5 is a flowchart showing an example of the operation of the image forming apparatus 1.

(1) Operation Before Installation of Expanded CPU Board

Before the expanded CPU board 20 is installed (S1: No), the connection signal of the signal line 140c to the motherboard CPU 11 is in the high level. In addition, the switch 141 is in the opened state, and the motherboard 10 serves as the root. The motherboard CPU 11, as shown in FIG. 4, controls the arbiter 112, the interrupt controller 113, the PCI-Express controller 115, and the CPU core 110 in accordance with a program A (see FIG. 3) written in the ROM 15 (S2).

The motherboard CPU 111 recognizes all the devices of the system (motherboard 10) (S3), and an ordinary operation is performed by the motherboard 10 (S4).

Then, addresses (areas) are assigned to each device by the motherboard CPU 11 (S5). When the directed operation is completed (S6: Yes), the system power supply unit 4 is turned off.

(2) Operation After Installation of Expanded CPU Board

When the switch 141 is operated to be closed and the expanded CPU board 20 is installed to the motherboard 10 by connecting the connector 25 of the expanded CPU board 20 to the expanded CPU board connector 19 of the motherboard 10 (S1: Yes), as explained above with FIG. 3, the connection signal of the signal line 140c to the motherboard CPU 11 becomes the low level. Thus, the motherboard CPU 11 detects the installation of the expanded CPU board 20.

When the expanded CPU board 20 is installed to the motherboard 10, the master of control of system control including signal control for external devices is changed from the motherboard CPU 11 to the expanded CPU 21 (S7).

At this time, programs B, C, and the like (see FIG. 3) that are needed for the operation of the motherboard CPU 11 are downloaded from the ROM 23 of the expanded CPU board 20 to the ROM 15 of the motherboard 10. Alternatively, the programs needed for the operation of the motherboard CPU 11 may be stored in the ROM 15 of the motherboard 10 in advance.

The arbiter 212 and the interrupt controller 213 use the expanded CPU board 20 side, and the arbiter 112 and the interrupt controller 113 that are located on the motherboard 10 side are in the unused state. In addition, the PCI-Express controller 215 located on the expanded CPU board 20 side becomes the root in accordance with the closing operation of the switch 141, and the PCI-Express controller 115 located on the motherboard 10 side becomes the end point (EP). As shown in FIG. 3, when the signal line 140d becomes the low level, the switches 13A and 13B within the motherboard 10 operate as the expanded CPU 21 side, the connectors 12A and 12B connected to the external devices are connected to the expanded CPU 21 through the switches 13A and 13B and the connectors 19A and 25A, and the CPU core 110 located on the motherboard 10 side is in the unused state (S7).

Next, the motherboard CPU 11 starts an operation in accordance with a selected program (S8).

The expanded CPU 21 recognizes all the devices of the system (the motherboard 10 and the expanded CPU board 20) (S9), and the expanded CPU 21 assigns addresses (areas) to each device (S10).

When ordinary operations are performed by the motherboard 10 located on the end point side and the expanded CPU board 20 located on the root side (S11), and the directed operation is completed (S6: Yes), the system power supply unit 4 is turned off.

[Second Exemplary Embodiment]

An image forming apparatus according to a second exemplary embodiment of the present invention has a configuration of configuration shift units which is different from that of the first exemplary embodiment, and is otherwise configured the same as the first exemplary embodiment.

Figure 6:
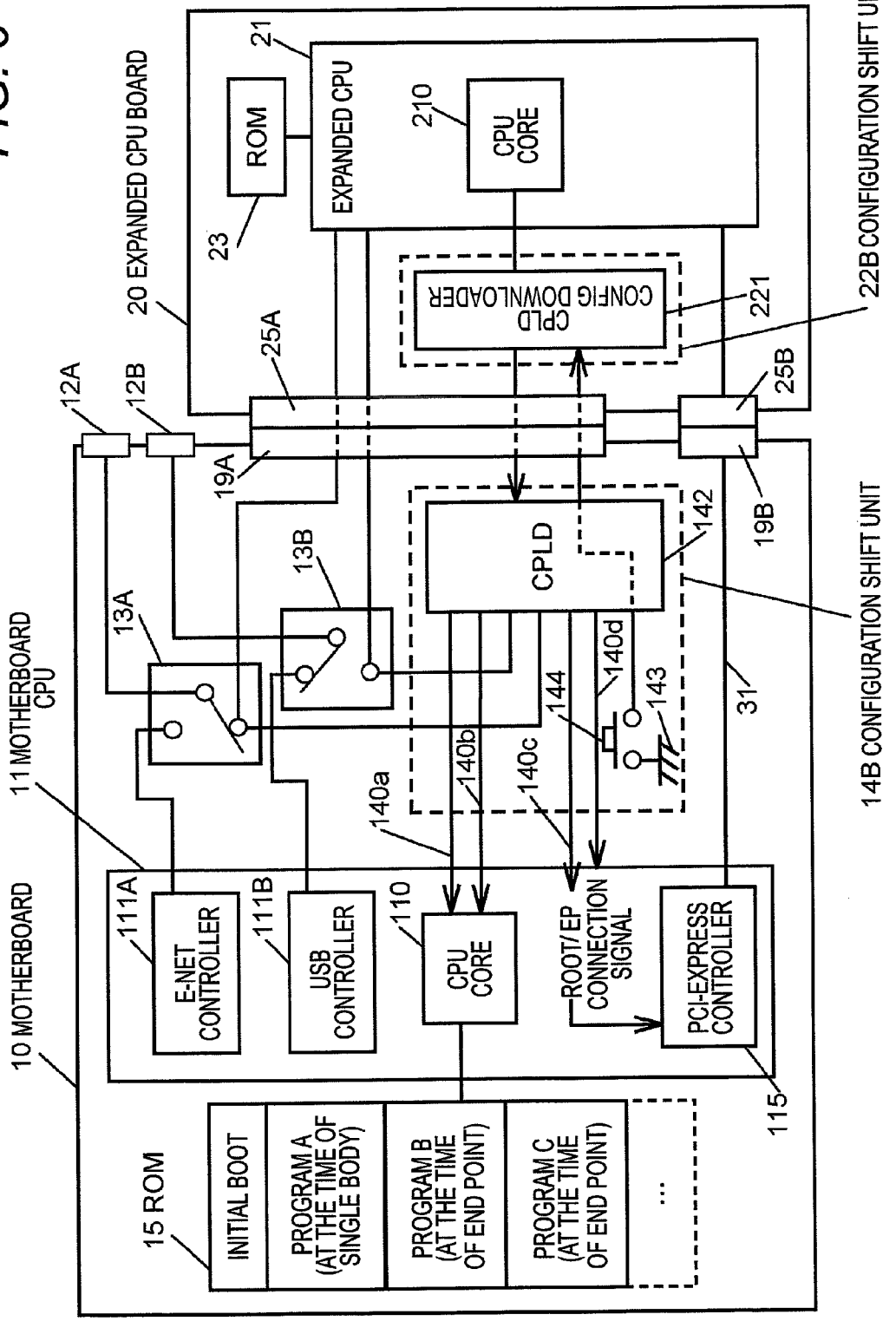
FIG. 6 is a diagram showing a configuration example of configuration shift units according to a second exemplary embodiment of the present invention.

FIG. 6 is a diagram showing a configuration example of the configuration shift units according to the second exemplary embodiment. The configuration shift units 14B and 22B according to this exemplary embodiment are configured to be shifted by a CPLD (Complex Programmable Logic Device) that is a programmable logic device.

The configuration shift unit 22B located on the expanded CPU board 20 side includes a CPLD Config downloader 221.

The configuration shift unit 14B located on the motherboard 10 side includes a CPLD 142 and a download start button 144 that is inserted between the CPLD 142 and a ground point 143. In addition, the configuration shift unit 14B derives signal lines 140a and 140b from the CPLD 142 to a CPU core 110, derives a signal line 140c to a motherboard CPU 11, and derives a signal line 140d to a PCI-Express controller 115.

Before the expanded CPU board 20 is installed to the motherboard 10, the CPLD 142 located on the motherboard 10 side allows the connection signal of the signal line 140d to have the high level and the signal of the signal line 140c to have the low level. Accordingly, the motherboard 10 side serves as the root.

When the expanded CPU board 20 is installed to the motherboard 10 and the CPLD download start button 144 is pressed down, the CPLD 142 transmits a press-down signal to the CPLD Config downloader 221, and the CPLD Config downloader 221 downloads (logically expands) the Config data of the CPLD 142 from the ROM 23 to the CPLD 142. The CPLD 142 located on the motherboard 10 side allows the connection signal of the signal line 140d to have the low level and the signal of the signal line 140c to have the high level. Accordingly, the expanded CPU board 20 side serves as a root. In the figure, a case where a switch 13A operates on the expanded CPU 21 side, and a switch 13B operates on the motherboard CPU 11 side is shown. However, on which side the switches 13A and 13B will operate can be arbitrarily set based on the Config data of the CPLD 142.

(Operation of Image Forming Apparatus)

FIG. 7 is a flowchart showing an example of the operation of the image forming apparatus 1.

(1) Operation Before Installation of Expanded CPU Board

The operation before installation of the CPU 20 is the same as that of the first exemplary embodiment. In other words, before the expanded CPU board 20 is installed (S21: No), the CPLD 142 of the motherboard 10 allows the signal of the signal line 140c to have the low level, and the motherboard 10 side serves as the root. In addition, the CPLD 142 allows the connection signal of the signal line 140d to have the high level. The motherboard CPU 11, as shown in FIG. 4, controls the arbiter 112, the interrupt controller 113, the PCI-Express controller 115, and the CPU core 110 in accordance with a program A (see FIG. 6) written in the ROM 15 (S22).

The motherboard CPU 11 recognizes all the devices of the system (motherboard 10) (S23), and an ordinary operation is performed by the motherboard 10 (S24).

Then, addresses (areas) are assigned to each device by the motherboard CPU 11 (S25). When the directed operation is completed (S26: Yes), the system power supply unit 4 is turned off.

(2) Operation After Installation of Expanded CPU Board

When a user installs the expanded CPU board 20 to the motherboard 10 by connecting the connector 25 of the expanded CPU board 20 to the expanded CPU board connector 19 of the motherboard 10 (S21: Yes) and presses down the CPLD download start button 144 (S13), the pin of the CPLD 142 becomes the high level so as to reset the motherboard 10 (S14).

The CPLD Config downloader 221 of the expanded CPU board 20 downloads (logically expands) the Config data of the CPLD 142 that is stored in the ROM 23 to the CPLD 142 of the configuration shift unit 14B located on the motherboard 10 side (S15).

Accordingly, the operation of the CPLD is started, an interrupt path and an IO path within the motherboard 10 are newly determined, a program of the motherboard 10 that will be used is selected (S16), and the reset of the motherboard 10 is cleared (S17).

On the other hand, the CPLD 142 allows the connection signal of the signal line 140d to the motherboard CPU 11 to have the low level, and the motherboard CPU 11 detects the installation of the expanded CPU board 20.

When the expanded CPU board 20 is installed to the motherboard 10, the master of control of system control including signal control for external devices is changed from the motherboard CPU 11 to the expanded CPU 21 (S27).

In other words, the arbiter 212 uses the expanded CPU board 20 side, and the arbiter 112 that is located on the motherboard 10 side is in the unused state. The interrupt controllers 113 and 213 use both the motherboard 10 side and the expanded CPU board 20 side. The PCI-Express controller 215 located on the expanded CPU board 20 side becomes the root, and the PCI-Express controller 115 located on the motherboard 10 side becomes the end point (EP). The E-net connector 12A is connected to the expanded CPU 21 through the connectors 19A and 25A by the switch 13A within the motherboard 10. The USB connector 12B is connected to the USB controller 111B of the motherboard CPU 11 by the switch 13B within the motherboard 10.

Next, the motherboard CPU 11 starts an operation in accordance with a selected program (S28).

The expanded CPU 21 recognizes all the devices of the system (the motherboard 10 and the expanded CPU board 20) (S29), and the expanded CPU 21 assigns addresses (areas) to each device (S30).

When ordinary operations are performed by the motherboard 10 located on the end point side and the expanded CPU board 20 located on the root side (S31), and the directed operation is completed (S26: Yes), the system power supply unit 4 is turned off.

[Third Exemplary Embodiment]

FIG. 8 is a diagram showing a configuration example of major parts of a motherboard and an expanded CPU board according to a third exemplary embodiment of the present invention.

(Configuration of Motherboard)

As interrupt generating modules of the motherboard 10 to the motherboard CPU 11, for example, there are an operation unit 3, an image input unit 5, an image output unit 6, a hot key 8, a remote monitoring device 9, and the like.

The motherboard CPU 11 includes: a general block 116a that receives interrupts from the operation unit 3, the hot key 8; and the remote monitoring device 9; a scan/print block 116b that receives interrupts from the image input unit 5 and the image output unit 6; and an interrupt determining unit 117 that determines whether the interrupt from the general block 116a or the scan/print block 116b is an INT interrupt (realtime interrupt) or an MSI (Message Signal Interrupt) interrupt (non-realtime interrupt).

The remote monitoring device 9 is connected to a central monitoring device that is remotely installed through a phone line or a communication line such as a LAN so as to transmit information representing the state of the image forming apparatus 1. The remote monitoring device 9 can check and manage the state of the image forming apparatus 1 by using the central monitoring device.

(Configuration of Expanded CPU Board)

In the Rom 23 of the expanded CPU board 20, a non-realtime OS 230 such as LINUX (registered trademark), an initialization kernel 231 common to all the OSs, and a realtime OS 232 such as VxWorks (registered trademark) are stored.

The expanded CPU 21 includes a CPU core 210, an INT interrupt controller 213a that receives an INT interrupt, and an MSI interrupt controller 213b that receives an MSI interrupt.

The CPU core 210 performs an INT interrupt process by using a realtime OS for the INT interrupt that is received by the INT interrupt controller 213a and performs an interrupt process by using a non-realtime OS for the INT interrupt that is received by the MSI interrupt controller 213b.

(Operation of Image Forming Apparatus)

When receiving an interrupt from the interrupt generating module through the general block 116a or the scan/print block 116b, the interrupt determining unit 117 of the motherboard CPU 11 determines whether the interrupt is an INT interrupt or an MSI interrupt. When the interrupt is the INT interrupt, the interrupt determining unit 117 notifies the INT interrupt controller 216a. On the other hand, when the interrupt is the MSI interrupt, the interrupt determining unit 117 notifies the MSI interrupt controller 216b. The CPU core 210 performs an interrupt process by using the realtime OS for the INT interrupt that is received by the INT interrupt controller 216a and performs an interrupt process by using the non-realtime OS for the INT interrupt that is received by the MSI interrupt controller 126b. As an example, a packet initiation interrupt or a pack completion interrupt generated at the time of image data transmission from the remote monitoring device can be performed at a high speed through PCI Express transmission, and thus the MSI interrupt is used. Accordingly, the process is performed by using the realtime OS. On the other hand, when a user performs an authentication process or the like, the user ID needs to be recognized without high volume data transmission. Accordingly, a high-speed process does not need to be performed, and thereby the process is performed by using the non-realtime OS.

COMPARATIVE EXAMPLE

In a comparative example in which interrupts from all the interrupt generating sources are configured to be collectively received by the non-realtime OS in the expanded CPU board, an interrupt is determined as being an interrupt for the non-realtime OS or the realtime OS, and the notification of an interrupt is performed for the real time OS in a case where the interrupt for the realtime OS is determined, about 200 ms is needed until the interrupt notification reaches the realtime OS. According to the third exemplary embodiment, a time until an interrupt notification reaches the realtime OS can be shortened to less than that of the comparative example.

Other Exemplary Embodiments

The present invention is not limited to the above-described exemplary embodiments and may be variously changed within the scope not departing from the basic concept of the present invention. For example, in each of the above-described exemplary embodiments, a case where the present invention is applied to an image forming apparatus has been described. However, the present invention can be applied to an information processing apparatus such as a personal computer or a cellular phone.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a main board on which a first CPU is mounted;
an expanded CPU board connector that is disposed on the main board and to which an expanded CPU board is connectable, a second CPU being mounted on the expanded CPU board;
an external device connector that is disposed on the main board and to which an external device is connected; and
a detection unit that detects that the expanded CPU board is installed to the expanded CPU board connector,
wherein, when the detection unit detects that the expanded CPU board is installed to the expanded CPU board connector, the first CPU controls the information processing apparatus to change an operation body, from the first CPU to the second CPU, of the information processing apparatus and signal control between the information processing apparatus and the external device, and
wherein the main board comprises:
a switch that physically connects any one of the first CPU and the second CPU to the external device; and
a configuration shift unit that operates the switch to physically connect the second CPU to the external device through the expanded CPU board connector in response to the detection unit detecting that the expanded CPU board is installed to the expanded CPU connector.

2. The information processing apparatus according to claim 1, wherein the second CPU executes a basic software program that performs a process in real-time and the other basic software program that performs a process in non-real-time, the main board includes an interrupt determining unit that determines whether an interrupt received from an interrupt generating module requires a real-time processing or not, and the second CPU executes one of the basic software program and the other basic software program based on a result of determination made by the interrupt determining unit.

3. An image forming apparatus comprising:

a main board including interfaces of an operation unit that receives a printing condition, an image input unit that receives image data read out from a document, and an image output unit that prints out the image data on a paper sheet;

an expanded CPU board connector that is disposed on the main board and to which an expanded CPU board is connectable, a second CPU being mounted on the expanded CPU board;

an external device connector that is disposed on the main board and to which an external device is connected;

a detection unit that detects that the expanded CPU board is installed to the expanded CPU board connector; and a first CPU that is mounted on the main board and controls the information processing apparatus to change an operation body, from the first CPU to the second CPU, of the information processing apparatus and signal control between the information processing apparatus and the external device, when the detection unit detects that the expanded CPU board is installed to the expanded CPU board connector, wherein the main board comprises:
  a switch that physically connects any one of the first CPU and the second CPU to the external device; and
  a configuration shift unit that operates the switch to physically connect the second CPU to the external device through the expanded CPU board connector in response to the detection unit detecting that the expanded CPU board is installed to the expanded CPU connector.

4. An information processing method for controlling an information processing apparatus including a main board on which a first CPU is mounted and an expanded CPU board connector to which an expanded CPU board is connectable, a second CPU being mounted on the expanded CPU board, the method comprising:

detecting an installation of the expanded CPU board to the expanded CPU board connector, changing an operation body, from the first CPU to the second CPU, of the information processing apparatus and signal control between the information processing apparatus and an external device, when the detection unit detects that the expanded CPU board is installed to the expanded CPU board connector; and controlling a switch of the main board to physically connect the second CPU to the external device through the expanded CPU board connector in response to detecting the installation of the expanded CPU board to the expanded CPU board connector.

* * * * *